(12) United States Patent
Kaushik et al.

(10) Patent No.: US 11,132,339 B2
(45) Date of Patent: Sep. 28, 2021

(54) SYNCHRONOUS REPLICATION FOR SYNCHRONOUS MIRROR COPY GUARANTEE

(71) Applicant: NetApp Inc., Sunnyvale, CA (US)

(72) Inventors: Akhil Kaushik, Bangalore (IN); Gaurav Verma, New Delhi (IN)

(73) Assignee: NetApp Inc., San Jose, CA (US)

( * ) Notice: Subject to any disclaimer, the term of this patent is extended or adjusted under 35 U.S.C. 154(b) by 283 days.

(21) Appl. No.: 16/269,838

(22) Filed: Feb. 7, 2019

(65) Prior Publication Data

US 2020/0151143 A1 May 14, 2020

(30) Foreign Application Priority Data

Nov. 13, 2018 (IN) .............................. 201841042615

(51) Int. Cl.
*G06F 7/00* (2006.01)
*G06F 16/178* (2019.01)
*G06F 9/54* (2006.01)

(52) U.S. Cl.
CPC .............. *G06F 16/178* (2019.01); *G06F 9/54* (2013.01)

(58) Field of Classification Search
CPC .... G06F 16/178; G06F 9/54; G06F 2209/542; G06F 9/4881
See application file for complete search history.

(56) References Cited

U.S. PATENT DOCUMENTS

| | | | |
|---|---|---|---|
| 6,581,075 B1* | 6/2003 | Guturu | G06F 16/273 |
| 7,434,091 B1* | 10/2008 | Karr | G06F 3/0614 |
| | | | 711/114 |
| 8,706,833 B1 | 4/2014 | Bergant et al. | |
| 9,235,632 B1* | 1/2016 | Natanzon | G06F 3/061 |
| 9,384,253 B1* | 7/2016 | Shuai | G06F 16/275 |
| 9,823,978 B2* | 11/2017 | Mutha | G06F 11/1461 |
| 10,430,400 B1* | 10/2019 | Bennett | G06F 16/2322 |
| 10,482,066 B2* | 11/2019 | Shah | G06F 3/067 |
| 2006/0212465 A1* | 9/2006 | Fish | G06F 11/2097 |

(Continued)

OTHER PUBLICATIONS

Hitachi Data Systems, "Hitachi AMS 2000 Family Command Control Interface (CCI) User's Guide", support.hitachivantara.com, 2014, 190 pages.

(Continued)

*Primary Examiner* — Mohammed R Uddin
(74) *Attorney, Agent, or Firm* — Cooper Legal Group, LLC

(57) ABSTRACT

Techniques are provided for synchronous replication for synchronous mirror copy guarantee. A file system dependent technique for synchronous mirror copy guarantee is provided by overriding default behavior of a persistent fence so that the persistent fence is activated to block operations targeting a storage object having a synchronous replication relationship based upon the synchronous replication relationship being out of sync. The default behavior of the persistent fence is overridden to allow operations to be executed upon the storage object based upon the synchronous replication relationship being in sync. A file system independent technique for synchronous mirror copy guarantee is provided by intercepting operations before the operations are received by a file system. The operations are selectively forwarded to the file system or not based upon a state of a synchronous replication relationship.

20 Claims, 10 Drawing Sheets

(56) References Cited

U.S. PATENT DOCUMENTS

| | | | |
|---|---|---|---|
| 2009/0313311 A1* | 12/2009 | Hoffmann | G06F 11/2097 |
| 2010/0205392 A1* | 8/2010 | Schnapp | G06F 3/0665 |
| | | | 711/162 |
| 2012/0191930 A1* | 7/2012 | Brown | G06F 3/0637 |
| | | | 711/162 |
| 2014/0258659 A1* | 9/2014 | Petersen | G06F 3/0634 |
| | | | 711/162 |
| 2016/0110378 A1* | 4/2016 | Mu | G06F 11/006 |
| | | | 707/634 |
| 2016/0299917 A1* | 10/2016 | Koos | G06F 16/178 |
| 2016/0328303 A1* | 11/2016 | Brandner | G06F 11/2094 |
| 2017/0155716 A1 | 6/2017 | Kimmel et al. | |
| 2017/0185306 A1* | 6/2017 | Eisler | G06F 11/2082 |
| 2017/0185491 A1* | 6/2017 | Hajare | G06F 3/061 |
| 2018/0260125 A1* | 9/2018 | Botes | G06F 3/067 |
| 2019/0102269 A1* | 4/2019 | Abouelwafa | G06F 3/065 |
| 2019/0354628 A1* | 11/2019 | Grunwald | G06F 11/2082 |
| 2020/0076827 A1* | 3/2020 | Gluck | H04L 9/3239 |

OTHER PUBLICATIONS

Lu, et al., "STAR: Scaling Transactions through Asymmetrical Replication", arxiv.org, 2014, 16 pages.

\* cited by examiner

SYNCHRONOUS REPLICATION FOR SYNCHRONOUS MIRROR COPY GUARANTEE

RELATED APPLICATIONS

This application claims priority to India Provisional Patent Application, titled "SYNCHRONOUS REPLICATION FOR SYNCHRONOUS MIRROR COPY GUARANTEE", filed on Nov. 13, 2018 and accorded Application No.: 201841042615, which is incorporated herein by reference.

BACKGROUND

Many industries may be subject to strict requirements for how data is stored and maintained. For example, a regulatory agency or government agency may impose a data storage redundancy requirement upon financial institutions or other industries. The data storage redundancy requirement may specify that at least two copies of any transaction (transaction data) must be maintained at all times. Thus, a storage system must always maintain at least the two copies of all transactions at all times. This is achieved through replication, such as synchronous replication.

When a transaction (e.g., a write operation) to write data to a first data object (e.g., a volume, a file, a storage virtual machine comprising a plurality of volumes stored across one or more nodes) is received from a client device, the transaction is not acknowledged as complete unless the transaction is locally committed to the first data object and is successfully replicated to a second data object maintained as a replication of the first data object. If the replication transaction fails to be executed upon the second data object, then the transaction must be failed (e.g. blocked or undone) so that the transaction is not fully committed to the first data object. Otherwise, the first data object and the second data object would not comprise the data same, and at least two copies of the transaction would may not be maintained. This would violate the data storage redundancy requirement. Thus, there is a need to efficiently and successfully ensure that multiple copies of every transaction are maintained at all times.

DETAILED DESCRIPTION

Figure 1:
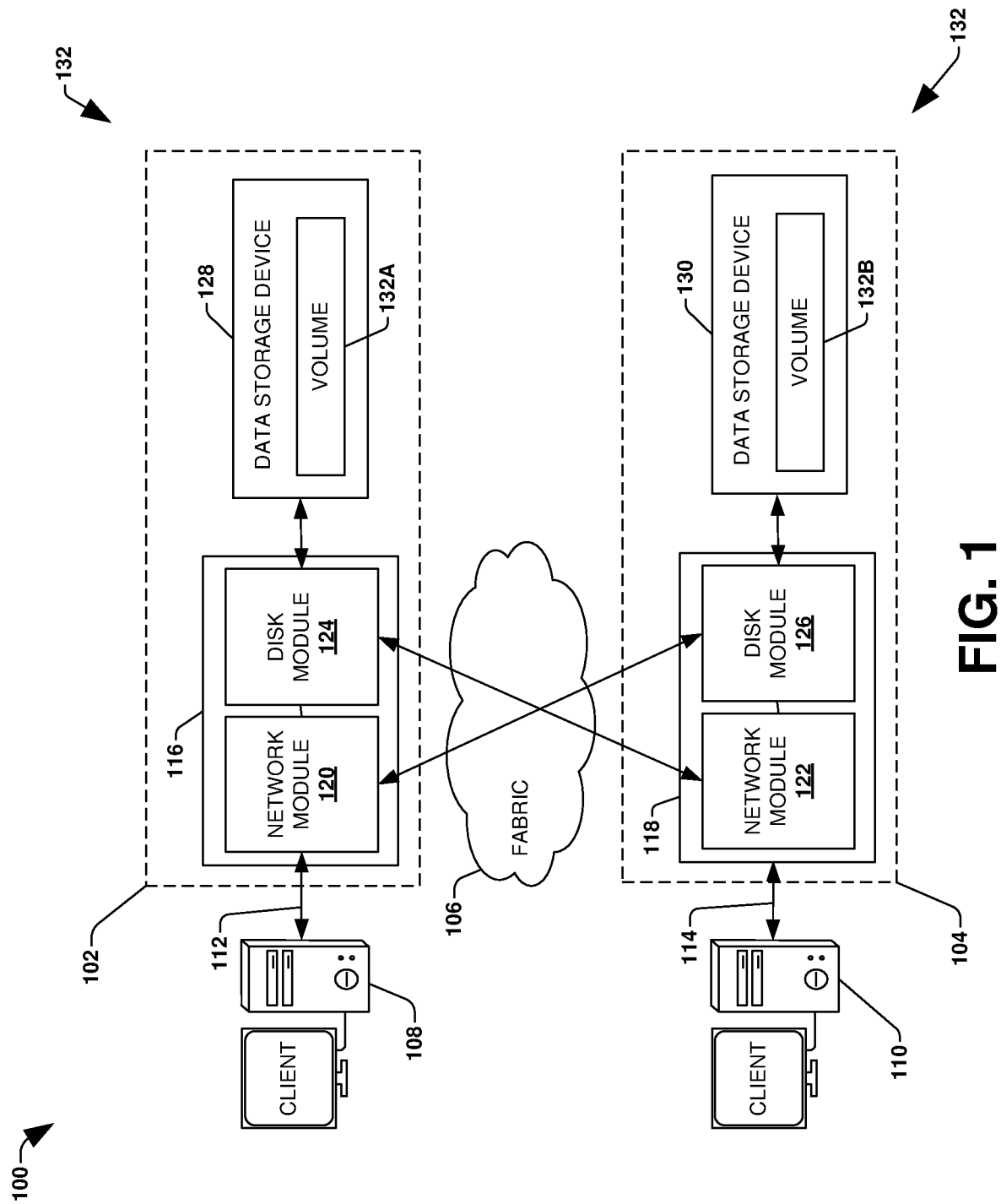
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

The methods and systems provided herein utilize synchronous replication, along with file system dependent and file system independent techniques, for guaranteeing the ability to maintain a synchronous mirror copy of a storage object. This allows storage systems to satisfy data storage redundancy requirements where multiple copies of data must be maintained at all times. The present system selectively allows operations to be executed upon a storage object having a synchronous replication relationship or blocks the operations from being executed upon the storage object based upon whether a synchronous replication relationship is in-sync or out of sync.

A synchronous replication relationship may be specified for a storage object, such as a file, a directory, a volume, a storage virtual machine comprising a plurality of volumes, etc. The synchronous replication relationship is in-sync when operations targeting the storage object are split and replicated to a replicated storage object before being acknowledged back to a client device. The synchronous replication relationship is out of sync when the operations cannot be successfully split and replicated to the replicated storage object, such as due to a network failure or any other failure. In such instances, the operations should not be executed upon the storage object if the operations cannot be replicated to the replicated storage object, such as where a data storage redundancy requirement is specified for the storage object. This is because the storage object will diverge from the replicated storage object due to new data and modifications only be performed upon the storage object, thus violating the data storage redundancy requirement that multiple copies of data must be maintained at all times.

In an embodiment, a file system dependent technique is used to ensure that multiple copies of data are maintained at all times in satisfaction of the data storage redundancy requirement. In particular, a file system natively provides fencing functionality to block and allow operations from being executed by the file system. When a persistent fence is activated, all operations are blocked. When the persistent fence is deactivated, all operations are allowed. As provided herein, default behavior of the persistent fence is overridden, which modifies operation the persistent fence. In particular, the persistent fence is selectively activated or deactivated based upon whether a synchronous replication relationship is in-sync or out of sync. The persistent fence may be activated to block both read and write operations or activated to block write operations and allow read operations. The persistent fence may be configured for activation/deactivation at a storage object level of granularity so that the fence is applied to only those storage objects having a synchronous replication relationship and being subject to the data storage redundancy requirement.

In an embodiment, a file system independent technique is used to ensure that multiple copies of data are maintained at all times in satisfaction of the data storage redundancy requirement. In an example, operations targeting a storage object having a synchronous replication relationship are intercepted before being sent to a file system for execution and replication. In an example, an I/O filter driver, executed above the file system within a storage stack, is controlled to selectively forward or block intercepted operations based upon a state of the synchronous replication relationship. For example, intercepted operations are forwarded to the file system for execution upon the storage object and are replicated to a replicated storage object based upon the synchronous replication relationship being in-sync. The intercepted operations are blocked from being forwarded to the file system for execution upon the storage object and are blocked from being replicated to the replicated storage object based upon the synchronous replication relationship being out of sync. In an example, a splitter, hosted within a boot time module that is loaded prior to the file system being loaded, is controlled to selectively forward or block the intercepted operations. In this way, the I/O filter driver and/or the splitter are controlled to selectively forward or block operations from reaching a file system based upon a state of a synchronous replication relationship in order to ensure that a data storage redundancy requirement is always met.

To provide for synchronous replication for synchronous mirror copy guarantee, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that synchronous replication for synchronous mirror copy guarantee may be implemented within the clustered network environment 100. It may be appreciated that synchronous replication for synchronous mirror copy guarantee may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
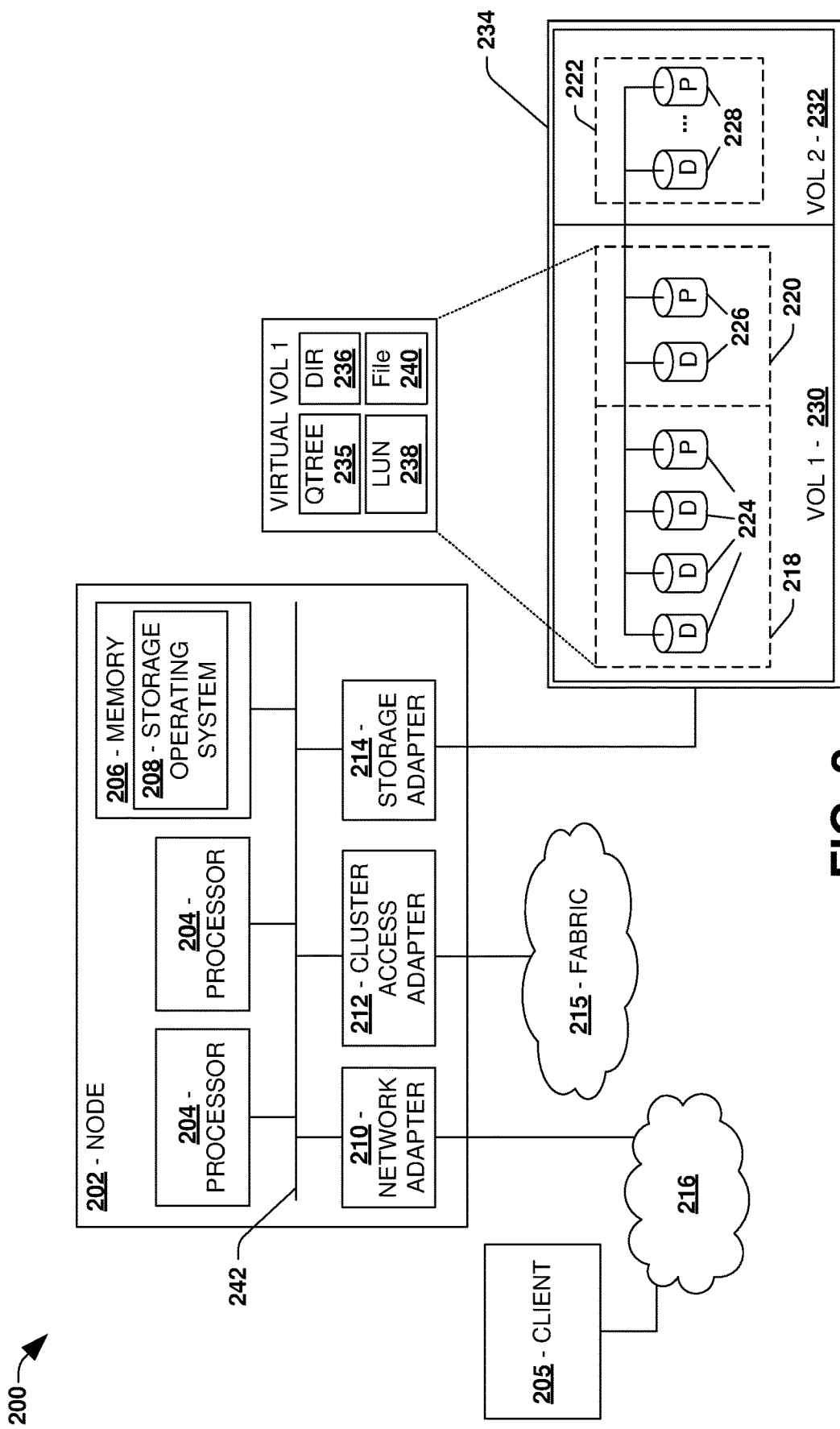
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that synchronous replication for synchronous mirror copy guarantee may be implemented for the data storage system 200. It may be appreciated that synchronous replication for synchronous mirror copy guarantee may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
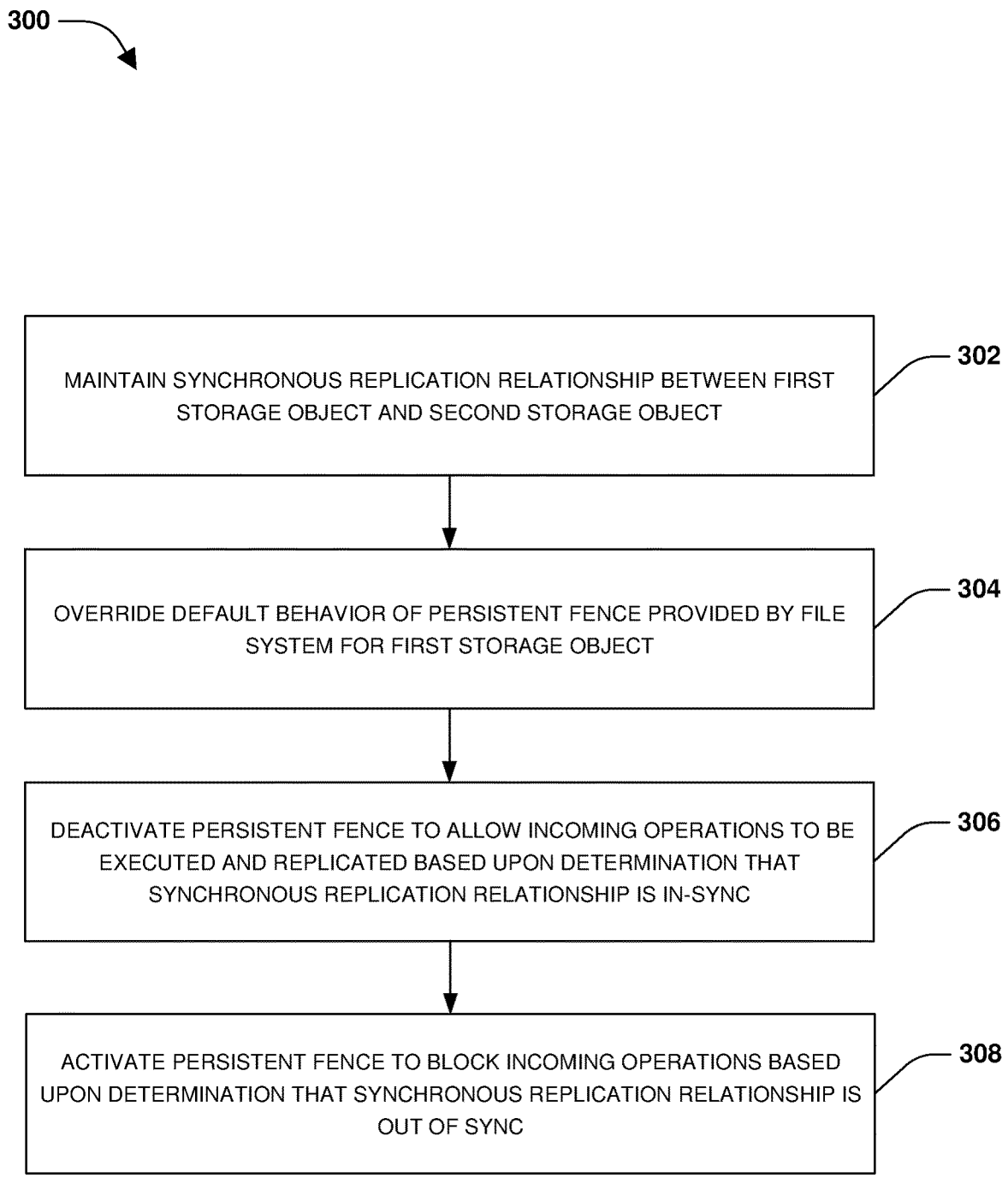
FIG. 3 is a flow chart illustrating an example method for synchronous replication for synchronous mirror copy guarantee using a persistent fence of a file system.
Figure 4A:
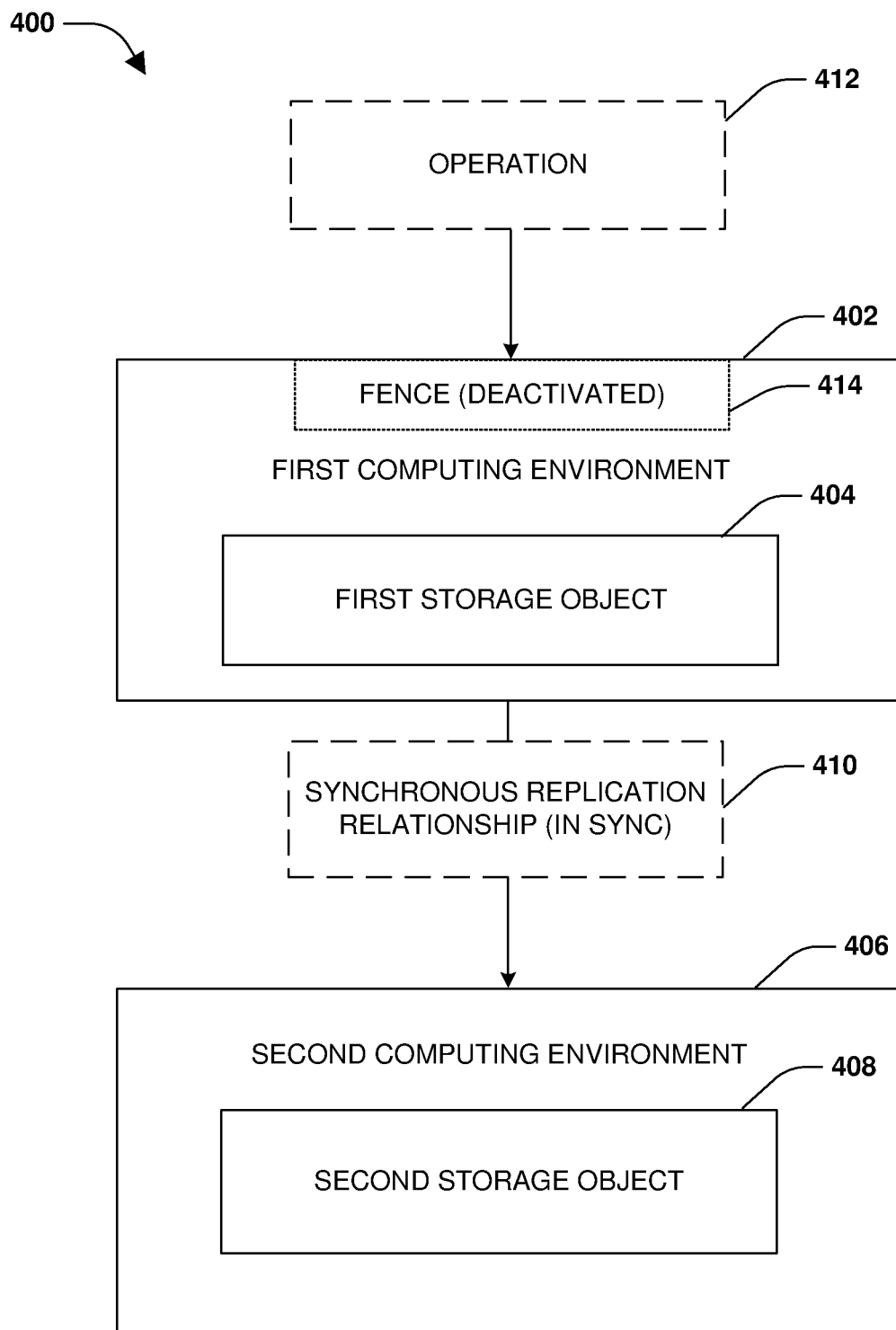
FIG. 4A is a component block diagram illustrating an example system for synchronous replication for synchronous mirror copy guarantee, where a persistent fence is deactivated.
Figure 4B:
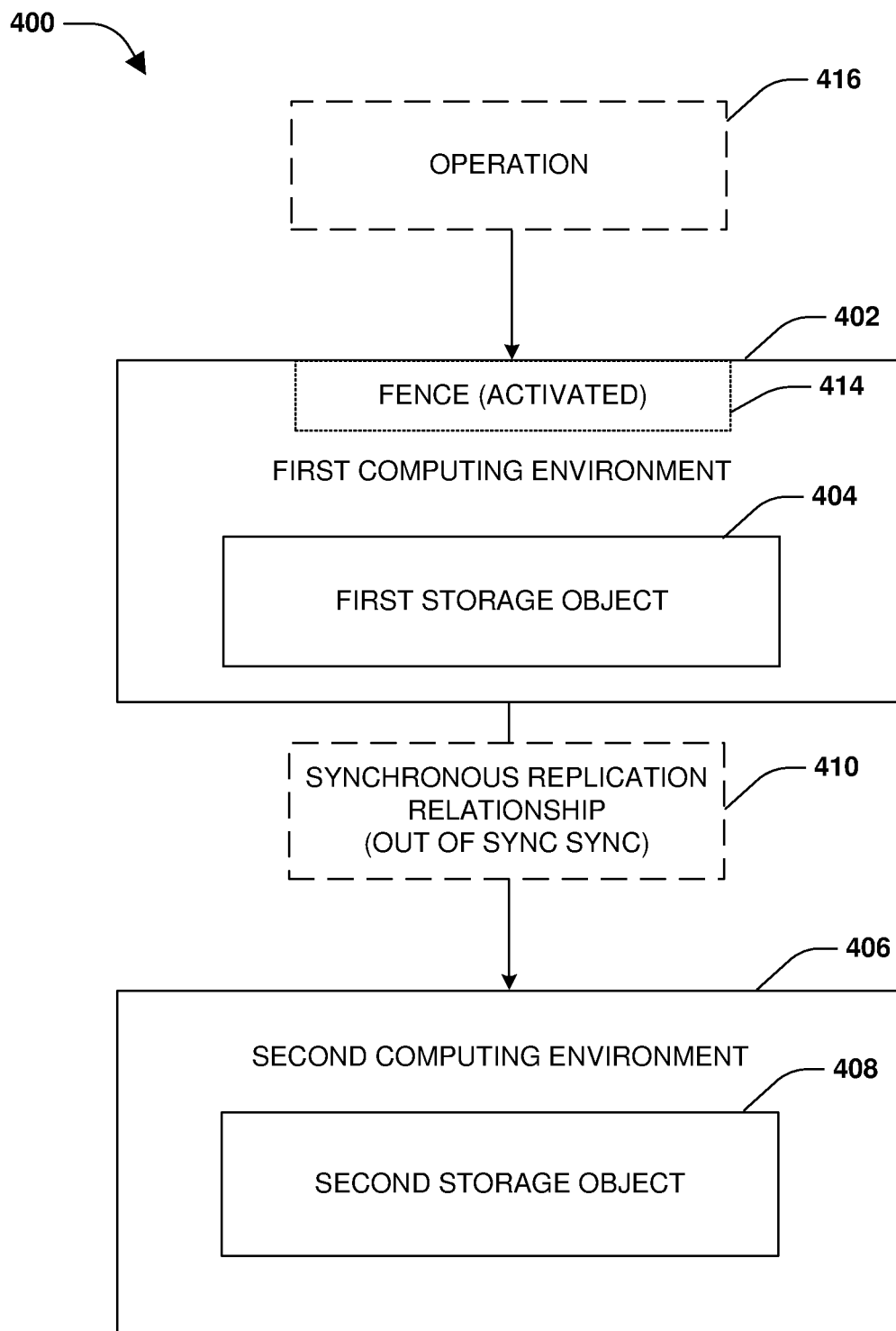
FIG. 4B is a component block diagram illustrating an example system for synchronous replication for synchronous mirror copy guarantee, where a persistent fence is activated.

One embodiment of synchronous replication for synchronous mirror copy guarantee is illustrated by an exemplary method 300 of FIG. 3 and further described in conjunction with system 400 of FIGS. 4A and 4B. A first computing environment 402 stores a first storage object 404, such as a file, a LUN, a volume, a storage virtual machine comprising a plurality of volumes, etc. A second computing environment 406 stores a second storage object 408 that is maintained as a mirror replica of the first storage object 404. The first computing environment 402 and the second computing environment 406 may comprise nodes, storage controllers, other types of computing devices, storage software such as software as a service, a cloud computing environment, etc.

A data storage redundancy requirement (a synchronous mirror copy guarantee) may be specified for the first storage object 404. The data storage redundancy requirement may specify that at least two instances of the first storage object 404 are to be maintained at all times, such as where the first storage object 404 and the second storage object 408 are to be maintained as duplicate instances of the same data. The data storage redundancy requirement may specify any number of instances of a storage object that are to be maintained at all times. Thus, when an operation is to be executed upon the first storage object 404, the operation must be successfully split and replicated to the second storage object 408 before being acknowledged as complete to a computing device that transmitted the operation to the first computing environment 402. This ensures that the first storage object 404 and the second storage object 408 always represent two instances of the same data at all times (e.g., from the perspective of the computing device or other clients having access to the first storage object 404). This can be achieved through synchronous replication.

At 302, a synchronous replication relationship 410 is maintained between the first storage object 404 and the second storage object 408, as illustrated by FIG. 4A. When the synchronous replication relationship 410 is in sync, operations are acknowledged to client devices based upon the operations being executed upon the first storage object 404 and successfully being replicated to the second storage object 408. However, the synchronous replication relationship 410 can become out of sync where operations are unable to be split and replicated to the second storage object 408. This can occur due to network failures, hardware failures, software failures, etc. If an operation is allowed to execute upon the first storage object 404 but is unable to successfully replicate to the second storage object 408, then the data storage redundancy requirement may be violated. Accordingly, as provided herein, operations targeting the first storage object 404 will be selectively allowed or blocked based upon whether the synchronous replication relationship 410 is in-sync or out of sync.

In an embodiment, default behavior of a persistent fence 414 natively provided by a file system of the first computing environment 402 is modified and used to ensure that the first storage object 404 and the second storage object 408 comprise duplicate copies of the same data so that that the data storage redundancy requirement is not violated.

At 304, the default behavior of the persistent fence 414 provided by the file system of the first computing environment 402 for the first storage object 404 is overridden. The default behavior may correspond to blocking all incoming operations targeting the first storage object 404 irrespective of the type of incoming operations and irrespective of whether the synchronous replication relationship 410 is in-sync or out of sync. The default behavior of the persistent fence 414 is overridden and reconfigured so that the persistent fence 414 can be used to selectively allow or block certain types of operations upon particular storage objects, such as the first storage object 404 subject to the data storage redundancy requirement and having the synchronous replication relationship 410. The operations are selectively allowed or blocked based upon a current state of the synchronous replication relationship 410.

When an operation 412 is received by the first computing environment 402, the operation 412 is evaluated to determine that the operation 412 targets the first storage object 404 subject to the data storage redundancy requirement and having the synchronous replication relationship 410. A current state of the synchronous replication relationship 410 is determined. For example, a splitter object, a synchronous replication engine, or other module may provide an indication as to the state of the synchronous replication relationship 410.

At 306, the persistent fence 414 is deactivated to allow incoming operations, such as the operation 412, to be executed upon the first storage object 404 and to be replicated to the second storage object 408 based upon a determination that the synchronous replication relationship 410 is in-sync, as illustrated by FIG. 4A. In this way, while the synchronous replication relationship 410 is in-sync, operations are locally executed by the first computing environment 402 upon the first storage object 404 and are split and replicated to the second storage object 408 before being acknowledged to client devices as being complete.

At 308, the persistent fence 414 is activated to block incoming operations, such as operation 416, based upon a determination that the synchronous replication relationship 410 is out of sync, as illustrated by FIG. 4B. In particular, when the operation 416 is received by the first computing environment 402, the synchronous replication relationship 410 is evaluated to determine whether operations targeting the first storage object 404 are able to be synchronously split and replicated to the second storage object 408 or not. For example, the splitter object or the synchronous replication engine may indicate that operations cannot be synchronously replicated to the second storage object 408 (e.g., a network or other type of failure is prohibiting the synchronous splitting and replicating of operations), and thus the synchronous replication relationship 410 has been transitioned to an out of sync state.

In an embodiment of activating the persistent fence 414, behavior of the persistent fence 414 may be modified to block modify operations (e.g., data write operations, metadata write operations, etc.) and allow read operations targeting the first storage object 404, as opposed to blocking all operations targeting the first storage object 404 while the synchronous replication relationship 410 is out of sync. This will not violate the data storage redundancy requirement for the first storage object 404 because the read operations will not modify the data of the first storage object 404, and thus will not cause data divergence between the first storage object 404 and the second storage object 408. In an embodiment of activating the persistent fence 414, behavior of the persistent fence 414 may be modified to block both modify operations and read operations while the synchronous replication relationship 410 is out of sync.

In an embodiment, a data management operation is received by the first computing environment 402. The data management operation comprises a protocol out-of-band operation, such as a snapshot create operation, a volume clone operation, a file clone operation, an on-demand move operation, an on-demand copy operation, or other types of storage management operations. In an example, the default behavior of the persistent fence 414 may be overridden to block all data management operations while the synchronous replication relationship 410 is out of sync. In another example, the default behavior of the persistent fence 414 may be overridden to block only certain types of data management operations.

In an embodiment of activating the persistent fence 414 for only certain types of data management operations, the persistent fence 414 is activated to block data management operations that access an active file system of the first computing environment 402 while the synchronous replication relationship 410 is out of sync. These types of data management operations would modify active data of the first computing environment 402 such as an active instance of the first storage object 404 accessible to client devices through the first computing environment 402. In contrast, the default behavior of the persistent fence 414 is modified to allow data management operations that access an existing snapshot of the active file system while the synchronous replication relationship 410 is out of sync. The snapshot comprises a point in time representation of the active file system, which may represent a backup of the active file system. Client devices are usually not provided with read and write access to snapshots because the snapshots are backups meant to preserve a state of the active file system at a particular point in time. Thus, data management operations targeting the snapshot are allowed while the synchronous replication relationship 410 is out of sync because such data management operations do not modify data of the active file system actively accessible to client devices. In this way, the first storage object 404 and the second storage object 408 will still represent 2 instances of the same data in satisfaction of the data storage redundancy requirement.

In an embodiment, incoming operations are grouped into a read only category and a write category. The persistent fence 414 is activated to block incoming operations grouped into the write category while the synchronous replication relationship 410 is out of sync. Behavior of the persistent fence 414 is modified to allow incoming operations grouped into the read only category while the synchronous replication relationship 410 is out of sync. In this way, incoming operations are evaluated to determine whether such incoming operations are write operation or read operations, and are grouped into write and read categories for categorical blocking or executing of incoming operations by the persistent fence 414.

In an embodiment, the persistent fence 414 is deactivated to perform a data mobility operation to move the first storage object 404 and/or the second storage object 408. The data mobility operation may comprise a snapshot creation operation to create a snapshot for a cutover workflow of the data mobility operation. The persistent fence 414 is reactivated after the data mobility operation completes. Allowing the persistent fence 414 to be deactivated for the data mobility operation regardless of whether the synchronous replication relationship 410 is in-sync or out of sync does not violate the data storage redundancy requirement for the first storage object 404 because the first storage object 404 and the second storage object 408 will still represent the same data.

In an embodiment, while the synchronous replication relationship 410 is in-sync, the persistent fence 414 is deactivated and therefore the process of going out of sync involves activating the persistent fence 414. Activating the persistent fence 414 can be achieved in multiple ways. One such way is where new and incoming operations are sent to the file system with an indicator to activate the persistent fence 414. Another way is by asynchronously calling a file system API/interface to activate the persistent fence 414. Activation of the persistent fence 414 can be achieved through either of these techniques or other techniques. If both techniques are used, then the persistent fence 414 will be activated by whichever technique occurs first.

In an embodiment, the synchronous replication relationship 410 can be brought into sync. Before operations are forwarded to the file system, the persistent fence 414 must be deactivated. Deactivation of the persistent fence 414 can be achieved by calling a file system API interface. Once deactivated, the operations are allowed to be executed by the file system. Finally, the allow operations are executed upon the first storage object 404 and are split and replicated to the second storage object 408 based upon the synchronous replication relationship 410 now being in-sync.

Figure 5:
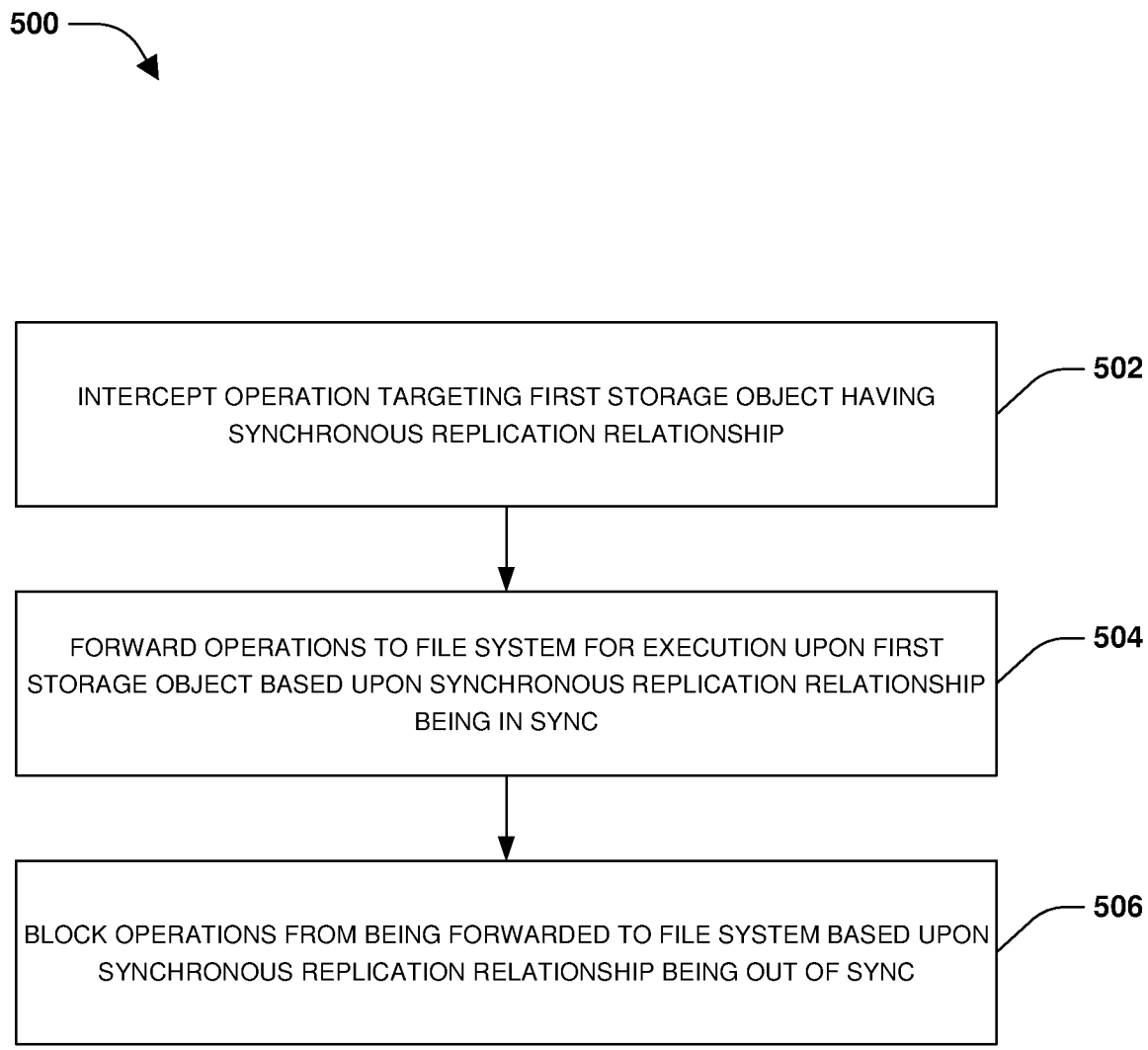
FIG. 5 is a flow chart illustrating an example method for synchronous replication for synchronous mirror copy guarantee.
Figure 6A:
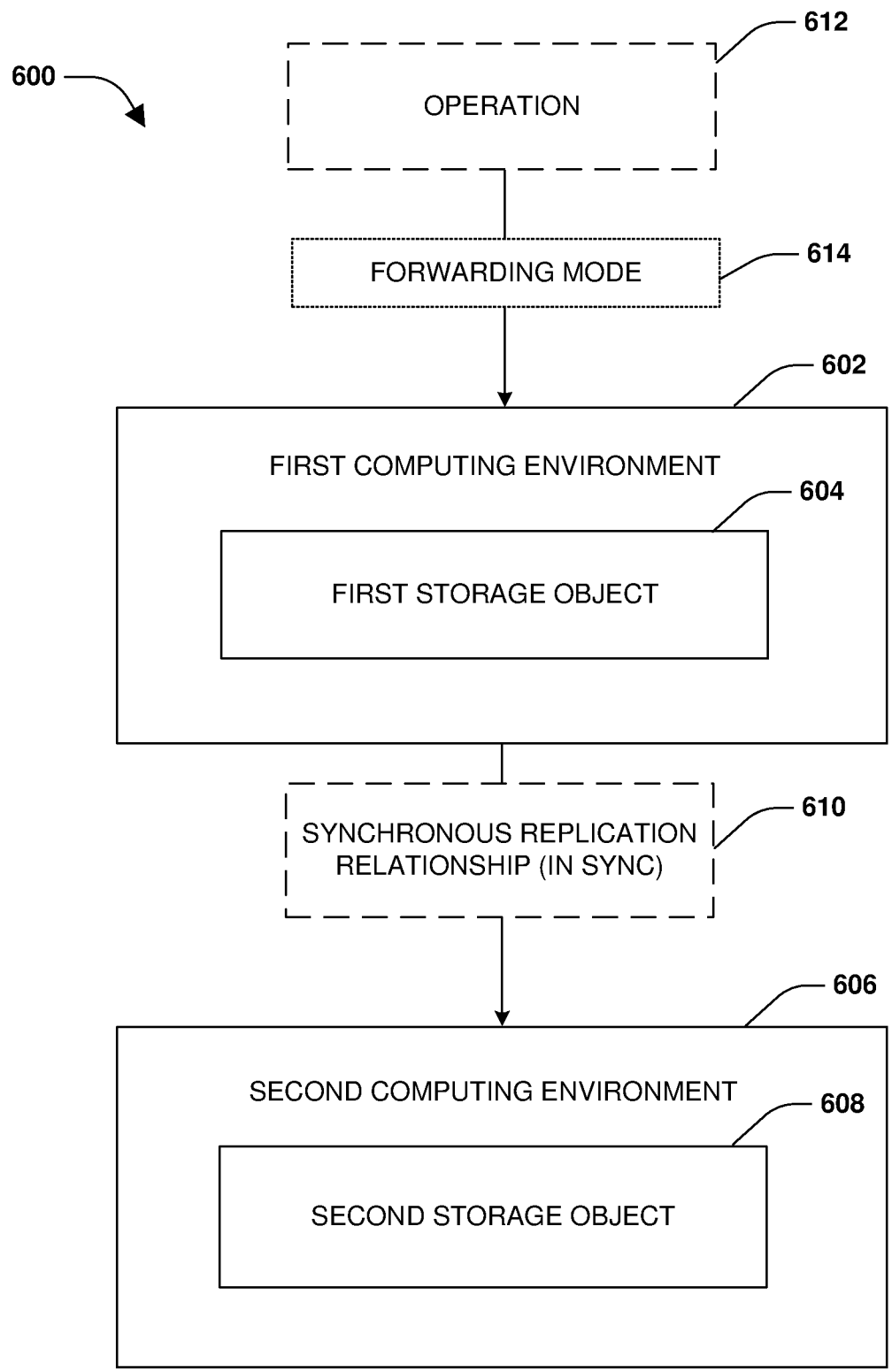
FIG. 6A is a component block diagram illustrating an example system for synchronous replication for synchronous mirror copy guarantee, where operations are forwarded to a file system.
Figure 6B:
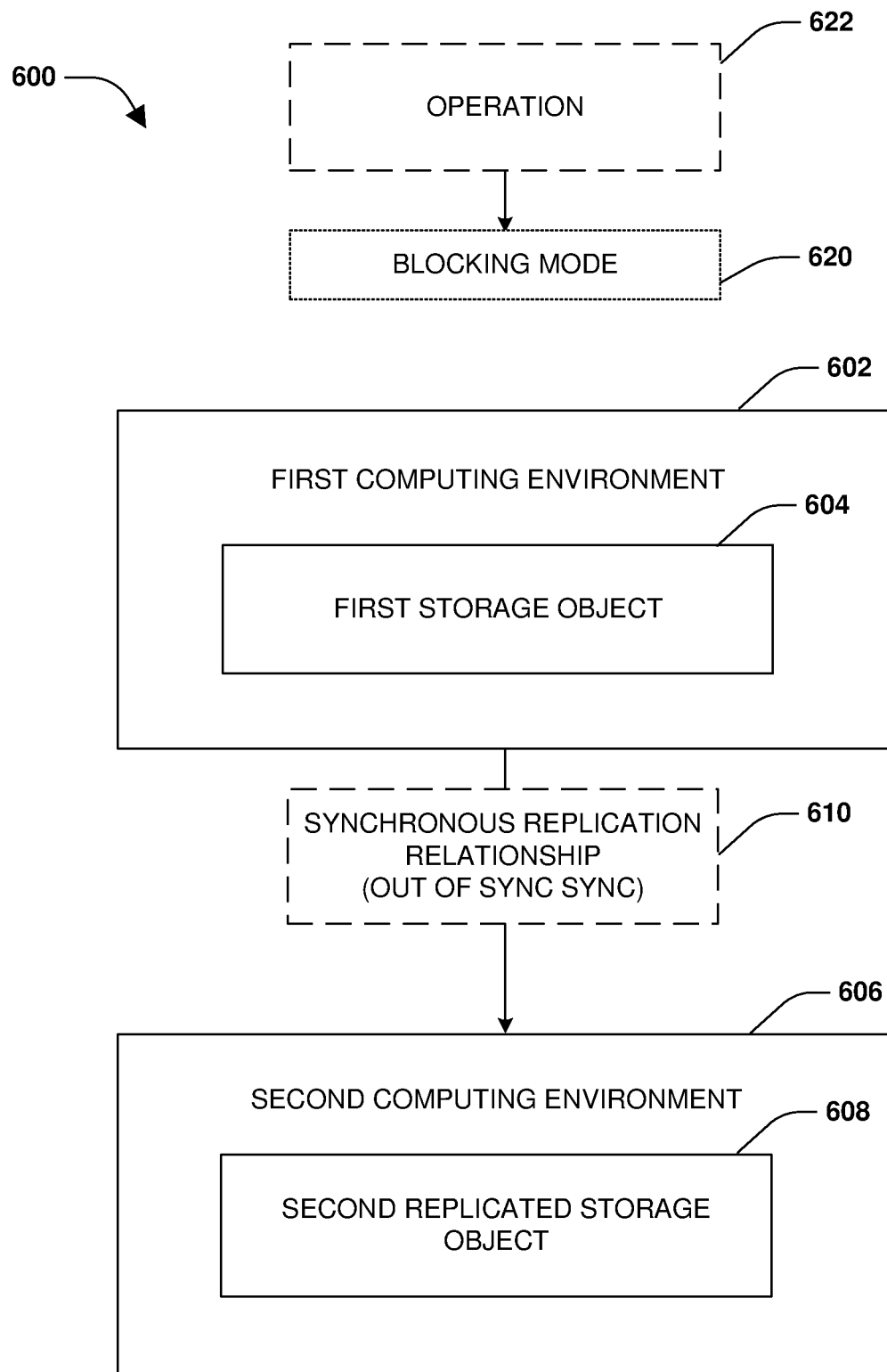
FIG. 6B is a component block diagram illustrating an example system for synchronous replication for synchronous mirror copy guarantee, where operations are blocked from being forwarded to a file system.

One embodiment of synchronous replication for synchronous mirror copy guarantee is illustrated by an exemplary method 500 of FIG. 5 and further described in conjunction with system 600 of FIGS. 6A and 6B. A first computing environment 602 (e.g., a first node) stores a first storage object 604, such as a file, a LUN, a volume, a storage virtual machine comprising a plurality of volumes, etc. A second computing environment 606 (e.g., a second node) stores a second storage object 608 that is maintained as a mirror replica of the first storage object 604. A synchronous replication relationship 610 is maintained between the first storage object 604 and the second storage object 608, as illustrated by FIG. 6A. When the synchronous replication relationships 610 is in sync, operations are acknowledged based upon the operations being executed upon the first storage object 604 and successfully being replicated to the second storage object 608.

A data storage redundancy requirement may be specified for the first storage object 604. The data storage redundancy requirement may specify that at least two instances (or any other number of duplicate instances) of the first storage object 604 are to be maintained at all times. For example, the data storage redundancy requirement may be satisfied when the first storage object 504 and the second storage object 608 are in-sync and comprise the same data. Thus, when an operation is to be executed upon the first storage object 604, the operation must be successfully split and replicated to the second storage object 608 before being acknowledged as complete to a computing device that transmitted the operation to the first computing environment 602. This ensures that the first storage object 604 and the second storage object 608 always represent two instances of the same data at all times with respect to the computing devices having access to the first storage object 604. This can be achieved through synchronous replication. However, if the synchronous replication relationship 610 goes out of sync, then operations are unable to successfully be split and replicated to the second storage object 608. Thus, the data storage redundancy requirement will be violated if the operations are allowed to be executed upon only the first storage object 604 without being replicated to the second storage object 608 (or other storage objects maintained as replicas of the first storage object 604) because the first storage object 604 will comprise different data than the second storage object 608.

Accordingly, as provided herein, operations are intercepted and selectively forwarded to a file system for execution or are blocked from being forwarded to the file system based whether the synchronous replication relationship 610 is in-sync or out of sync.

A splitter may be configured with interceptor functionality for intercepting operations targeting the first storage object 604 having the synchronous replication relationship 610. The splitter may be configured with splitter functionality for replicating such operations to the second storage object 608. In an embodiment, the splitter, hosted within a boot time module that is loaded prior to a file system of the first computing environment 602 being loaded, is loaded during boot. The splitter is controlled to intercept operations before the operations are received by the file system of the first computing environment 602. The splitter is configured to selectively forward or block operations based upon a state of the synchronous replication relationship 610.

In an embodiment, an I/O filter driver, executing above the file system within a storage stack, is controlled to intercept operations before the operations are received by the file system of the first computing environment 602. The I/O filter driver is controlled to selectively forward or block operations based upon a state of the synchronous replication relationship 610. In this way, the splitter and/or the I/O filter driver can be used to intercept and selectively forward or block operations based upon a state of the synchronous replication relationship 610. These techniques may be used for host-based sync implementation where the file system is located on a local host-based device, where the file system is a network attached file system, and/or where the file system is co-located with storage array replication.

At 502, operations targeting the first storage object 604 having the synchronous replication relationship 610 with the second storage object 608 are intercepted. At 504, responsive to the synchronous replication relationship 610 being in sync, operations, such as an operation 612, are forwarded 614 to the file system of the first computing environment 602 for execution upon the first storage object 604 and for replication to the second storage object 608, as illustrated by FIG. 6A. At 506, operations, such as an operation 622, are blocked 620 from being forwarded to the file system based upon the synchronous replication relationship 610 being out of sync, as illustrated by FIG. 6B.

Figure 7:
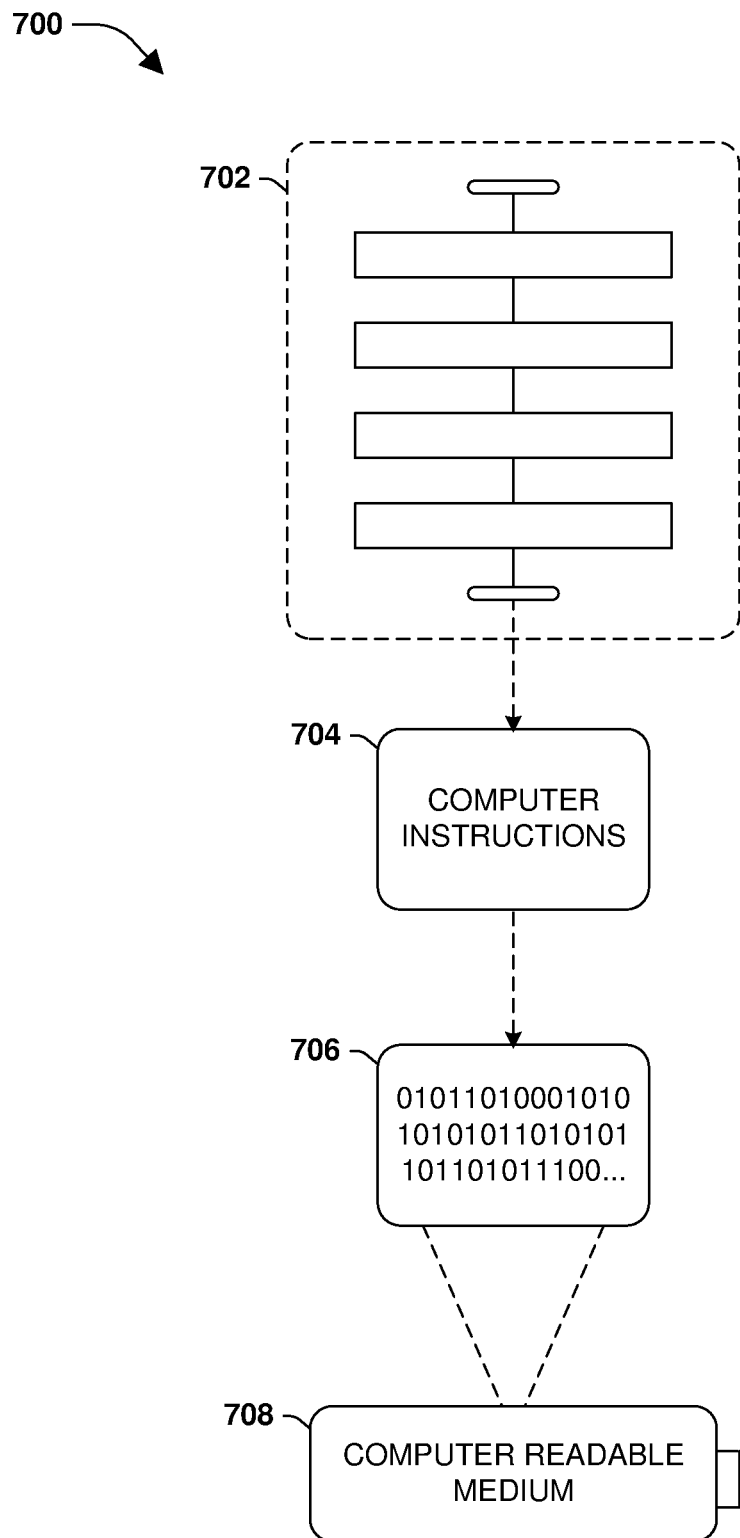
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises a processor-executable computer instructions 704 configured to operate according to one or more of the principles set forth herein. In some embodiments, the processor-executable computer instructions 704 are configured to perform a method 702, such as at least some of the exemplary method 300 of FIG. 3 and/or at least some of the exemplary method 500 of FIG. 5, for example. In some embodiments, the processor-executable computer instructions 704 are configured to implement a system, such as at least some of the exemplary system 400 of FIGS. 4A and 4B and/or at least some of the exemplary system 600 of FIGS. 6A and 6B, for example. Many such computer-readable media are contemplated to operate in accordance with the techniques presented herein.

Figure 8:
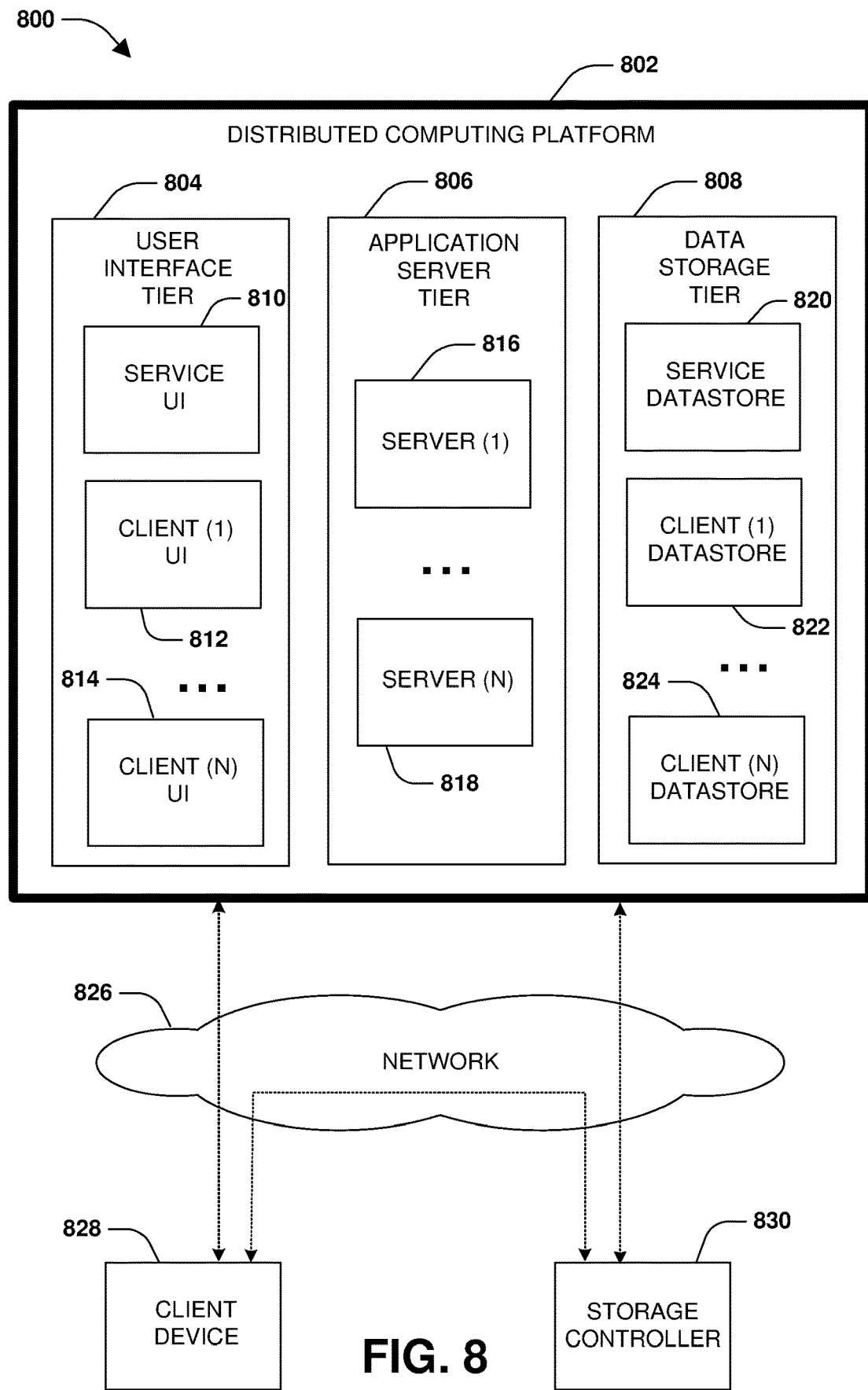
FIG. 8 is a component block diagram illustrating an example computing environment in which an embodiment of the invention may be implemented.

FIG. 8 is a diagram illustrating an example operating environment 800 in which an embodiment of the techniques described herein may be implemented. In one example, the techniques described herein may be implemented within a client device 828, such as a laptop, tablet, personal computer, mobile device, wearable device, etc. In another example, the techniques described herein may be implemented within a storage controller 830, such as a node configured to manage the storage and access to data on behalf of the client device 828 and/or other client devices. In another example, the techniques described herein may be implemented within a distributed computing platform 802 such as a cloud computing environment (e.g., a cloud storage environment, a multi-tenant platform, etc.) configured to manage the storage and access to data on behalf of the client device 828 and/or other client devices.

In yet another example, at least some of the techniques described herein are implemented across one or more of the client device 828, the storage controller 830, and the distributed computing platform 802. For example, the client device 828 may transmit operations, such as data operations to read data and write data and metadata operations (e.g., a create file operation, a rename directory operation, a resize operation, a set attribute operation, etc.), over a network 826 to the storage controller 830 for implementation by the storage controller 830 upon storage. The storage controller 830 may store data associated with the operations within volumes or other data objects/structures hosted within locally attached storage, remote storage hosted by other computing devices accessible over the network 826, storage provided by the distributed computing platform 802, etc. The storage controller 830 may replicate the data and/or the operations to other computing devices so that one or more replicas, such as a destination storage volume that is maintained as a replica of a source storage volume, are maintained. Such replicas can be used for disaster recovery and failover.

The storage controller 830 may store the data or a portion thereof within storage hosted by the distributed computing platform 802 by transmitting the data to the distributed computing platform 802. In one example, the storage controller 830 may locally store frequently accessed data within locally attached storage. Less frequently accessed data may be transmitted to the distributed computing platform 802 for storage within a data storage tier 808. The data storage tier 808 may store data within a service data store 820, and may store client specific data within client data stores assigned to such clients such as a client (1) data store 822 used to store data of a client (1) and a client (N) data store 824 used to store data of a client (N). The data stores may be physical storage devices or may be defined as logical storage, such as a virtual volume, LUNs, or other logical organizations of data that can be defined across one or more physical storage devices. In another example, the storage controller 830 transmits and stores all client data to the distributed computing platform 802. In yet another example, the client device 828 transmits and stores the data directly to the distributed computing platform 802 without the use of the storage controller 830.

The management of storage and access to data can be performed by one or more storage virtual machines (SMVs) or other storage applications that provide software as a service (SaaS) such as storage software services. In one example, an SVM may be hosted within the client device 828, within the storage controller 830, or within the distributed computing platform 802 such as by the application server tier 806. In another example, one or more SVMs may be hosted across one or more of the client device 828, the storage controller 830, and the distributed computing platform 802.

In one example of the distributed computing platform 802, one or more SVMs may be hosted by the application server tier 806. For example, a server (1) 816 is configured to host SVMs used to execute applications such as storage applications that manage the storage of data of the client (1) within the client (1) data store 822. Thus, an SVM executing on the server (1) 816 may receive data and/or operations from the client device 828 and/or the storage controller 830 over the network 826. The SVM executes a storage application to process the operations and/or store the data within the client (1) data store 822. The SVM may transmit a response back to the client device 828 and/or the storage controller 830 over the network 826, such as a success message or an error message. In this way, the application server tier 806 may host SVMs, services, and/or other storage applications using the server (1) 816, the server (N) 818, etc.

A user interface tier 804 of the distributed computing platform 802 may provide the client device 828 and/or the storage controller 830 with access to user interfaces associated with the storage and access of data and/or other services provided by the distributed computing platform 802. In an example, a service user interface 810 may be accessible from the distributed computing platform 802 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 812, a client (N) user interface 814, etc. The client (1) can access various services and resources subscribed to by the client (1) through the client (1) user interface 812, such as access to a web service, a development environment, a human resource application, a warehouse tracking application, and/or other services and resources provided by the application server tier 806, which may use data stored within the data storage tier 808.

The client device 828 and/or the storage controller 830 may subscribe to certain types and amounts of services and resources provided by the distributed computing platform 802. For example, the client device 828 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 830 can establish a subscription to have access to certain services and resources of the distributed computing platform 802.

As shown, a variety of clients, such as the client device 828 and the storage controller 830, incorporating and/or incorporated into a variety of computing devices may communicate with the distributed computing platform 802 through one or more networks, such as the network 826. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 802, such as a multi-tenant business data processing platform or cloud computing environment, may include multiple processing tiers, including the user interface tier 804, the application server tier 806, and a data storage tier 808. The user interface tier 804 may maintain multiple user interfaces, including graphical user interfaces and/or web-based interfaces. The user interfaces may include the service user interface 810 for a service to provide access to applications and data for a client (e.g., a "tenant") of the service, as well as one or more user interfaces that have been specialized/customized in accordance with user specific requirements, which may be accessed via one or more APIs.

The service user interface 810 may include components enabling a tenant to administer the tenant's participation in the functions and capabilities provided by the distributed computing platform 802, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 808 may include one or more data stores, which may include the service data store 820 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 802 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    maintaining a synchronous replication relationship between a first storage object and a second storage object, wherein an operation is acknowledged based upon the operation being executed upon the first storage object and replicated to the second storage object;
    overriding default behavior of a persistent fence provided by a file system for the first storage object, wherein the overriding comprises modifying behavior of the persistent fence to allow data management operations that access an existing snapshot and block data management operations that access an active file system when the synchronous replication relationship is out of sync;
    activating the persistent fence to block incoming operations based upon a determination that the synchronous replication relationship is out of sync; and
    deactivating the persistent fence to allow incoming operations to be executed and replicated based upon a determination that the synchronous replication relationship is in sync.

2. The method of claim 1, wherein the default behavior corresponds to blocking all incoming operations targeting the first storage object irrespective of whether the synchronous replication relationship is in sync.

3. The method of claim 1, comprising:
    modifying behavior of the persistent fence to block modify operations and allow read operations when the synchronous replication relationship is out of sync.

4. The method of claim 1, wherein the activating comprises:
    activate the persistent fence to block modify operations and read operations when the synchronous replication relationship is out of sync.

5. The method of claim 1, comprising grouping incoming operations into a read only category and a write category.

6. The method of claim 5, comprising:
    activating the persistent fence to block incoming operations grouped into the write category when the synchronous replication relationship is out of sync.

7. The method of claim 6, comprising:
    modifying behavior of the persistent fence to allow incoming operations grouped into the read only category when the synchronous replication relationship is out of sync.

8. The method of claim 1, comprising:
    bringing the synchronous replication relationship in sync by invoking a file system application programming interface (API) to deactivate the persistent fence.

9. The method of claim 1, comprising:
    bringing the synchronous replication relationship out of sync by sending operations to the file system with an indicator to activate the persistent fence.

10. The method of claim 1, comprising:
    bringing the synchronous replication relationship out of sync by asynchronously invoking a file system application programming interface (API) to activate the persistent fence.

11. The method of claim 1, comprising:
    activating the persistent fence to block the data management operations that access the active file system when the synchronous replication relationship is out of sync.

12. The method of claim 1, wherein the activating comprises:
    deactivating the persistent fence to allow the data management operations that access the existing snapshot when the synchronous replication relationship is out of sync.

13. The method of claim 1, comprising:
    deactivating the persistent fence to perform a data mobility operation comprising a snapshot creation operation to create a snapshot for a cutover workflow of the data mobility operation to move the first storage object, wherein the fence is reactivated after the data mobility operation.

14. The method of claim 1, comprising:
    performing a data mobility operation to move the second storage object.

15. A non-transitory machine readable medium comprising instructions for performing a method, which when executed by a machine, causes the machine to:
    intercept operations targeting a first storage object having a synchronous replication relationship with a second storage object, wherein an operation is acknowledged based upon the operation being executed upon the first storage object and replicated to the second storage object;
    forward the operations to a file system for execution upon the first storage object and replication to the second storage object based upon the synchronous replication relationship being in sync;
    block the operations from being forwarded to the file system based upon the synchronous replication relationship being out of sync; and
    forward data management operations to the file system that access an existing snapshot and block data management operations that access an active file system when the synchronous replication relationship is out of sync.

16. The non-transitory machine readable medium of claim 15, wherein the instructions cause the machine to:
    control an I/O filter driver, executed above the file system within a storage stack, to selectively forward and block operations based upon a state of the synchronous replication relationship.

17. The non-transitory machine readable medium of claim 15, wherein the instructions cause the machine to:
    loading a splitter hosted within a boot time module that is loaded prior to the file system being loaded, wherein the splitter is controlled to selectively forward and block operations based upon a state of the synchronous replication relationship.

18. The non-transitory machine readable medium of claim 15, wherein the instructions cause the machine to:
block read operations and write operations from being forwarded to the file system based upon the synchronous replication relationship being out of sync.

19. The non-transitory machine readable medium of claim 15, wherein the instructions cause the machine to:
allow read operations and block write operations from being forwarded to the file system based upon the synchronous replication relationship being out of sync.

20. A computing device comprising:
a memory comprising machine executable code for performing a method; and
a processor coupled to the memory, the processor configured to execute the machine executable code to cause the processor to:
maintain a synchronous replication relationship between a first storage object and a second storage object, wherein an operation is acknowledged based upon the operation being executed upon the first storage object and replicated to the second storage object;
override default behavior of a persistent fence provided by a file system for the first storage object, comprising modifying behavior of the persistent fence to allow data management operations that access an existing snapshot and block data management operations that access an active file system when the synchronous replication relationship is out of;
activate the persistent fence to block incoming operations based upon a determination that the synchronous replication relationship is out of sync; and
deactivate the persistent fence to allow incoming operations to be executed and replicated based upon a determination that the synchronous replication relationship is in sync.

\* \* \* \* \*